United States Patent [19]
Schlereth

[11] Patent Number: 5,176,454
[45] Date of Patent: Jan. 5, 1993

[54] ELASTIC BEARING BLOCK FOR A LINEAR GUIDE

[75] Inventor: Rudolf Schlereth, Burkardroth, Fed. Rep. of Germany

[73] Assignee: Deutsche Star GmbH, Schweinfurt, Fed. Rep. of Germany

[21] Appl. No.: 771,344

[22] Filed: Oct. 4, 1991

[30] Foreign Application Priority Data

Oct. 16, 1990 [DE] Fed. Rep. of Germany ....... 4032820

[51] Int. Cl.$^5$ ............................................... F16C 31/06
[52] U.S. Cl. ............................................................ 384/45
[58] Field of Search ................ 384/45, 57, 54, 48, 384/38, 22

[56] References Cited

U.S. PATENT DOCUMENTS

| | | |
|---|---|---|
| 4,566,738 | 1/1982 | Fasth . |
| 4,637,738 | 1/1987 | Barkley .................. 384/38 |
| 4,743,124 | 5/1988 | Blaurock ................. 384/45 |
| 4,867,579 | 9/1989 | Gallone .................. 384/57 |
| 4,921,360 | 5/1990 | Rotterman . |
| 5,076,714 | 12/1991 | Teramachi .............. 384/45 |

FOREIGN PATENT DOCUMENTS

| | | |
|---|---|---|
| 211243 | 1/1990 | European Pat. Off. . |
| 0448485 | 9/1991 | European Pat. Off. . |
| 3328800 | 2/1985 | Fed. Rep. of Germany . |
| 3815595 | 11/1989 | Fed. Rep. of Germany . |
| 558114 | 6/1977 | U.S.S.R. . |

*Primary Examiner*—Lenard A. Footland
*Attorney, Agent, or Firm*—Brumbaugh, Graves, Donohue & Raymond

[57] ABSTRACT

According to one example of embodiment of the invention, a bearing block 16 for a linear guide is constructed with two mutually perpendicularly crossing bending webs 28 and 34, formed by crossed double slits.

21 Claims, 5 Drawing Sheets

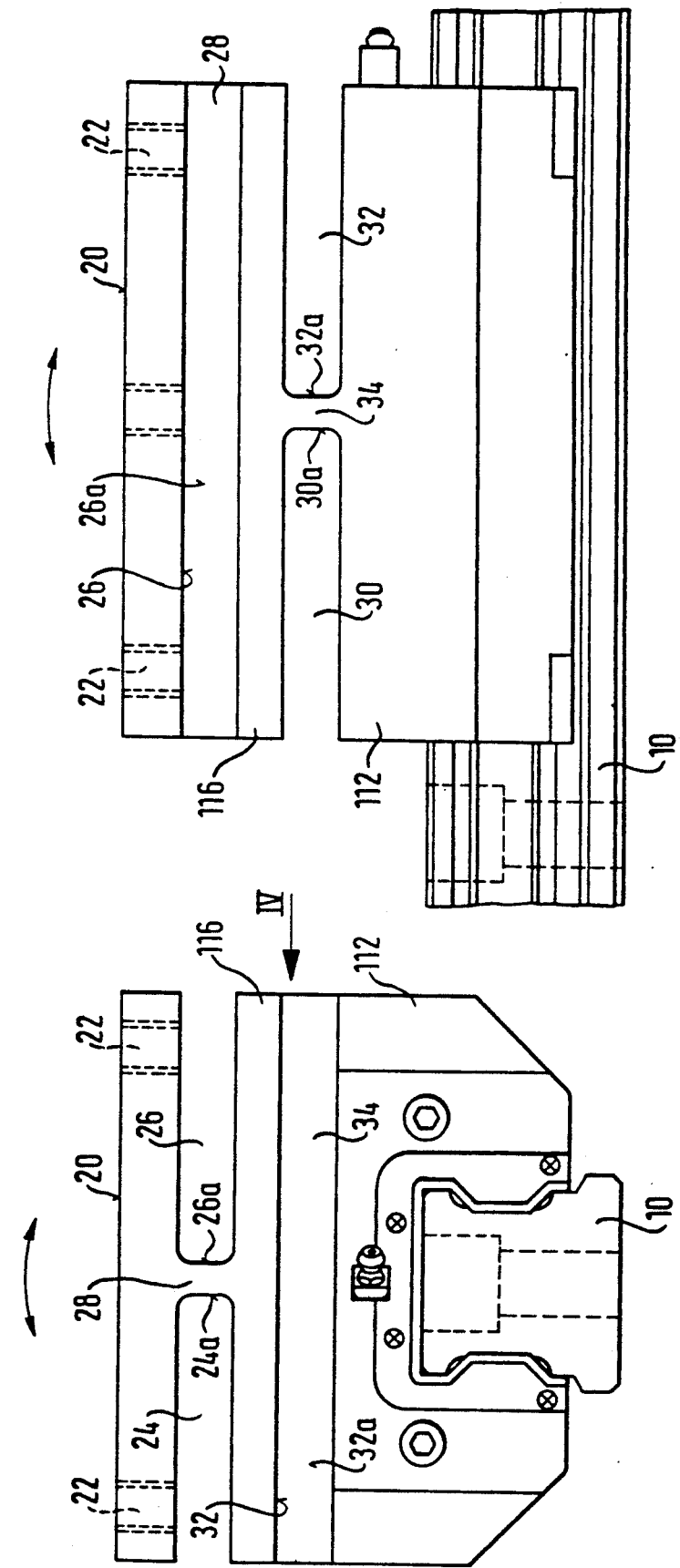

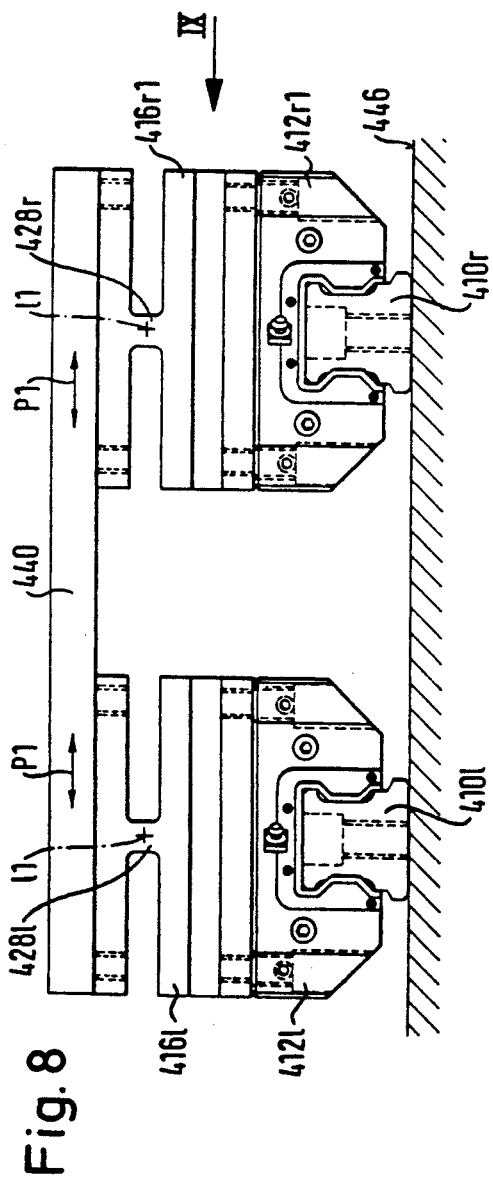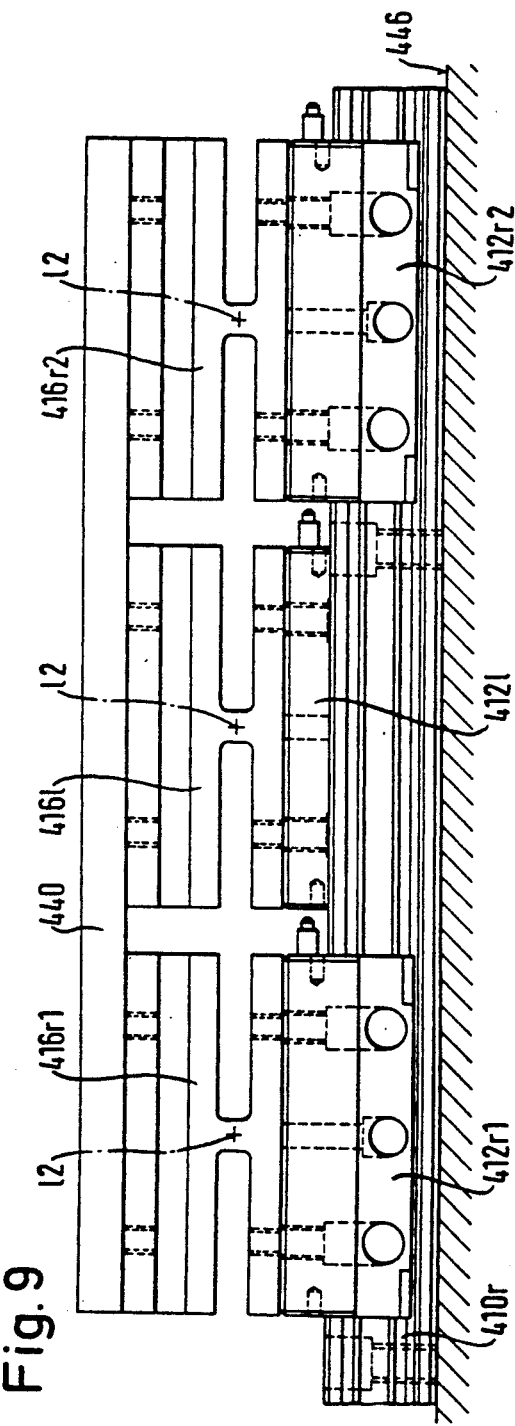

ELASTIC BEARING BLOCK FOR A LINEAR GUIDE

BACKGROUND OF THE INVENTION

This invention relates to an elastic bearing block for the mounting of a linearly guided structural element on a guide element, which is linearly guided on a guide track assembly in a guide direction, wherein, in the bearing block, a first slit bounded by a first slit base is provided in a first space slab approximately parallel to the guide direction, the first slit base of which (slit) bounds a first bending web of the bearing block, and wherein this first bending web—as viewed in a sectional plane parallel to the first space slab—has an elongate cross-section with a short and a long cross-sectional axis and the long cross-sectional axis forms a first bending axis of the bearing block.

STATEMENT OF THE PRIOR ART

From U.S. Pat. No. 4,637,738, it is known to guide a table on two mutually parallel guide rods by means of a group of guide elements for each, wherein the guide rods are constructed with circular cross-section and the guide elements possess corresponding guide bores. The guide table is connected with each of the guide elements by an I-section bearing block, the web of which is formed by slits into the bearing block from both sides and extends parallel to the guide direction. Of the flanges of the I-section bearing block, one is connected to the table and the other to the relevant guide element. The web of the I-section bearing block forms an elastic bending location with a bending axis parallel to the guide direction. The bearing blocks are suitable to only a limited extent for compensating incorrect settings of the guide rods relative to one another. For example, they are not suitable for compensating skew settings of the guide rods relative to each other to a larger extent.

OBJECT OF THE INVENTION

The object of the present invention is to construct an elastic bearing block of the initially named type in such a way that it shall be suitable to an increased degree for compensating incorrect settings of several guide tracks of a linear guide.

SUMMARY OF THE INVENTION

For solving this problem, it is proposed according to this invention that an elastic bearing block for mounting a structural element, which is to be linearly guided, on a guide element, is linearly guided on a guide track assembly in a guidance direction. In the bearing block, at least one first slit, bounded by a first slit base, is provided in a first virtual space slab approximately parallel to the guide direction. The first slit base of said first slit bounds a first bending web of the bearing block.

This first bending web—as viewed in a sectional plane parallel to the first virtual space slab—has an elongate cross-section with a short and a long cross-sectional axis. The long cross-sectional axis forms a first bending axis of the bearing block.

In a second virtual space slab, substantially parallel to the first virtual space slab, at least one second slit, bounded by a second slit base, is provided. The second slit base of said second slit, extending substantially perpendicularly to the first slit base, bounds a second bending web of the bearing block. This second bending web—as viewed in a sectional plane substantially parallel to the second virtual space slab—has an elongate cross-section with a short and a long cross-sectional axis. The long cross-sectional axis constitutes a second bending axis of the bearing block and the second bending axis crosses the first bending axis approximately perpendicularly.

In a bearing block constructed according to this invention, as a result of the mutually crossing bending axes, a larger compensating capability of the bearing block exists for a multiplicity of linear guides.

Particularly simple relationships for the calculation (design) of linear guides are obtained if the first bending axis is substantially parallel to the guide direction and the second bending axis is substantially perpendicular to the guide direction.

Extremely high tensile and compressive stiffness of the bearing block in a direction perpendicular to the space slabs, and an all-round ease of assembly are obtained by the provision, in at least one of the first and second space slabs, of two first and second slits respectively, of which the slit bases form between them a first and second bending web respectively, especially if the bearing block, as viewed in a direction perpendicular to the space slabs, possesses a substantially rectangular outline and if the two bending webs each extend parallel to one boundary side of the rectangular outline, and if the two bending axes cross one another at the centre of the rectangular outline.

The bearing block can be releasably connected with at least one of the components—guide element and structural element—for example by threaded bolts. In this connection it is advantageous for high versatility of use of the bearing block if the bearing block bears against at least one of the components, structural element and guide element, in a fixing plane which is approximately parallel to the first and the second bending axes.

In addition it is also conceivable for the bearing block to be constructed in one piece with at least one, and preferably one, of these components—guide element and structural element.

To eliminate notch stresses as far as possible in the region of the slit bases, it is proposed that the slit base of at least one of the slits shall be formed by the peripheral surface of a bore which opens into the slit. This bore may have a diameter larger than the width of the slit.

The bearing block may, essentially, be made from a very wide variety of materials which satisfy the particular strength requirements, amongst others of plastics. In the case of use in machine tools and the like, the bearing block will preferably be made of metal and of spring steel.

The bearing blocks of this invention prove to be especially suitable in cases where a structural element is to be guided by means of a guide element on a guide rail, and where the guide element is non-rotatable about the guide rail. Linear guides comprising a guide rail and a guide element linearly slidable but unrotatable thereon are known, for example, from European Patent Specification 211 243, to which reference is made in amplification of the disclosure. With such a linear guide, a structural element can be guided on at least one guide rail, using at least one bearing block as connecting means between the structural element and at least one guide element, guided on the guide rail.

According to a first form of embodiment of such a linear guide, it is provided that the structural element is mounted by at least one bearing block on at least one guide element running on a guide rail, and that the structural element furthermore is guided by at least one additional supporting element on a supporting track parallel to the guide rail and located outside the guide rail. The supporting element may cooperate here with the supporting track especially in such a manner that no lateral guide forces can be transferred between the supporting element and the supporting track in a plane joining the guide rail and the supporting track. For this particular application, the construction of the bearing block according to this invention is especially suitable, because the bearing block is essentially torsionally stiff about a vertical axis perpendicular to the space slabs, so that even if only one single guide element is used on the guide rail and one single bearing block between this guide element and the structural element, the parallel guidance of the structural element along the guide rail is assured.

Especially favourable guide conditions are obtained when the total number of the guide elements and of the additional supporting elements is at least and is preferably 3.

As supporting elements without lateral guidance on the supporting track, rollers which run on a flat plane, that is a plane not profiled in the region of the track, are especially suitable. This running plane may also be the support for the guide rail.

A form of embodiment especially suitable from the aspect of accurate guidance and economy provides that two supporting elements are provided, spaced apart in the guide direction, adjacent to one guide element. In this form of construction, assurance is provided by the two bending axes of the bearing block, firstly that an error in height of the supporting track relative to the guide rail is compensated, and secondly that a deviation in parallelism of the guide rail axis from the running plane is compensated. Finally, by the torsional stiffness of the bearing block about an axis perpendicular to the space slabs, assurance is provided that the structural element is torsionally stiff about this vertical axis, even when no guide forces act between the supporting elements and the supporting track in the plane connecting the supporting track and the guide rail. The problem of maintaining parallelism of the guide rails in their connecting plane that arises in linear guides comprising two laterally running guide rails simply does not exist in this form of embodiment.

The bearing blocks according to this invention can, however, be used also when the structural element is guided on two basically parallel guide rails by at least one guide element on each, such as in a form of embodiment in which the structural element is guided on a first guide rail by two guide elements with one bearing block for each and on the second guide rail by a single guide element, again using one bearing block.

The guide element is preferably of the type of the guide elements described in European Patent Specification No. 211 243, that is to say is preferably of U-shape, comprising at least two arms accepting a part of the guide rail between them and a web connecting these arms together, at least one roller unit being associated with each of the arms and each of the roller units having a load-transmitting row of rolls each in engagement with a load-carrying track of the relevant arm of the guide element and a load-transfer track on a lateral face of the guide rail adjacent to this arm, and at least one bearing block being mounted on the web.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be described in greater detail below by reference to the forms of embodiment as represented in the drawings, wherein the Figures show:

FIG. 3 a view corresponding to FIG. 1, in the case where the guide element and bearing block are in one piece;

FIG. 4 a lateral view on FIG. 3 in the direction of arrow IV of FIG. 3;

FIG. 8 a linear guide using several assemblies according to FIG. 1;

FIG. 9 a lateral view on FIG. 8 in the direction of arrow IX of FIG. 8.

DESCRIPTION OF PREFERRED EMBODIMENTS

Figure 2:
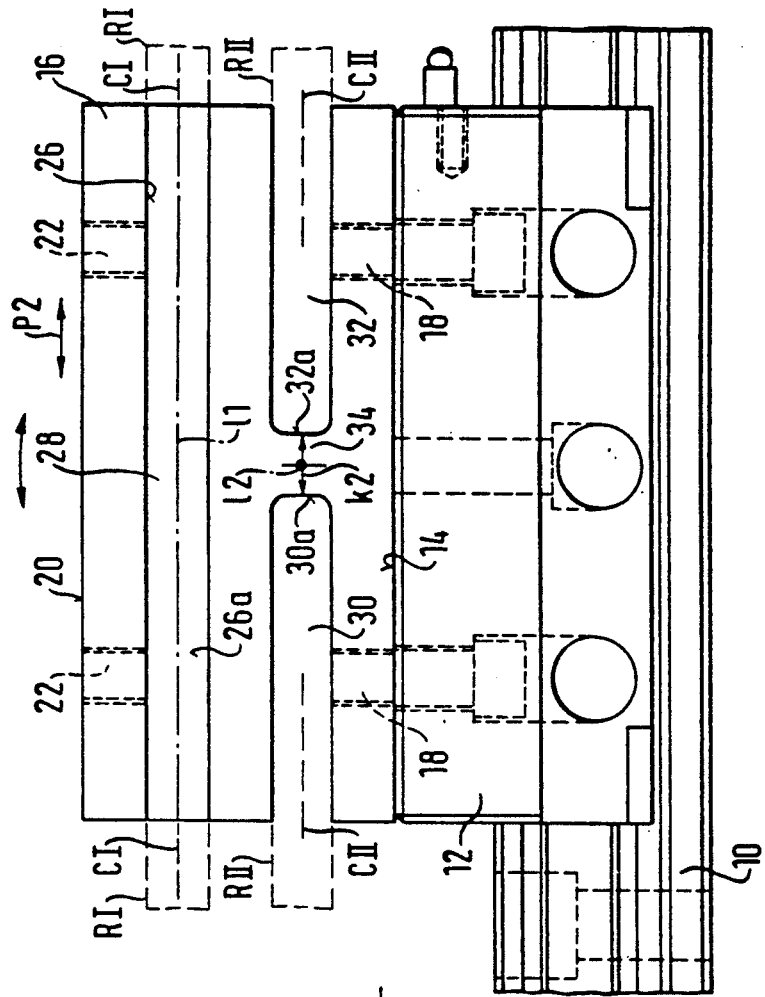
FIG. 2 a lateral view of FIG. 1 in the direction of arrow II of FIG. 1.
Figure 1:
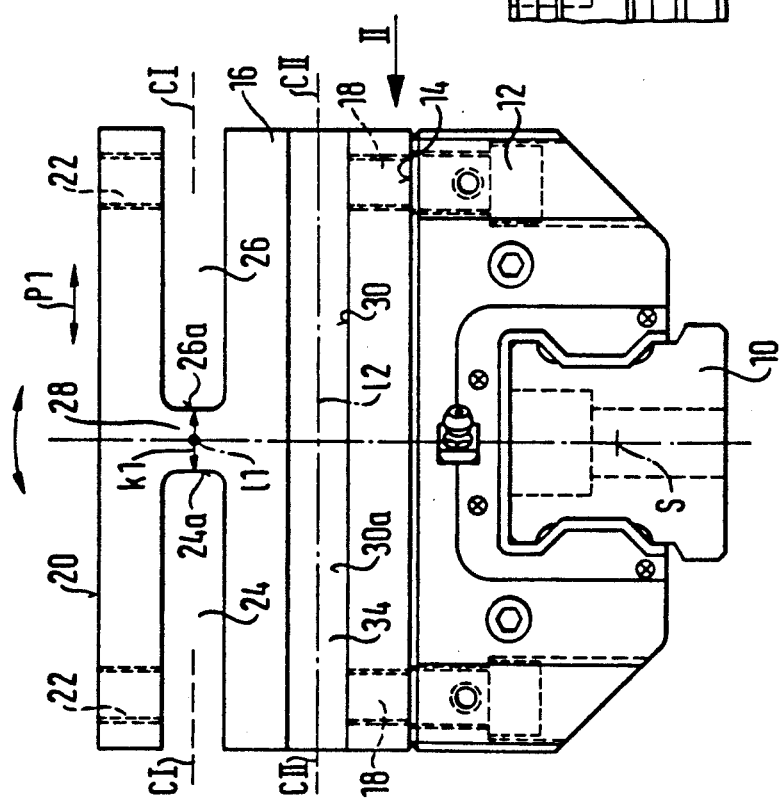
FIG. 1 a guide rail with guide element and bearing block, seen in the direction of the longitudinal axis of the guide rail.

In FIGS. 1 and 2, reference 10 denotes a guide rail, on which a U-shaped guide carriage 12 is slidably guided. The guide carriage 12 is non-rotatable about the longitudinal axis S of the guide rail. Details of the guidance of the guide carriage 12 and of the guide rail 10 will be discussed later in connection with FIG. 5. For other aspects, reference should be made to European Patent Specification No. 211 243.

The guide carriage 12 has a clamping face 14, on which an elastic bearing block 16 is mounted and secured by bolts 18. The bearing block 16 in turn has a clamping face 20, on which a structural element, for example a displaceable part of a machine tool, can be clamped, for which purpose threaded bores 22 are provided. The bearing block 16 possesses, in a first virtual space slab RI, two first slits 24 and 26 each having a slit base surface 24a and 26a. The slit base surfaces 24a and 26a define between them a first bending web 28, which has, viewed in a cross-sectional plane CI, an elongate cross-section having a short cross-sectional axis k1 and a long cross-sectional axis l1. The long cross-sectional axis l1 constitutes a first bending axis, which is parallel to the longitudinal axis S of the guide rail 10. In a second virtual space slab RII parallel to the first space slab RI second slits 30 and 32 having slit base surfaces 30a and 32a are provided. These slit base surfaces 30a and 32a define a second bending web 34, which possesses in a cross-sectional plane CII once again an elongate cross-section having a short cross-sectional axis k2 and a long cross-sectional axis 12, the long cross-sectional axis 12 constituting a second bending axis of the bearing block 16. The two bending axes 11 and 12 cross each other perpendicularly. The clamping face 20 can pivot relative to the guide element 12 both about the first bending axis 11 and about the second bending axis 12. Furthermore, depending upon the design of the short cross-sectional axes k1 and k2, an elastic displacement facility of the upper clamping face 20 in the direction of the double arrows P1 and P2 is also conceivable, in which case an S-shaped deformation of the relevant bending web occurs.

The form of embodiment of FIGS. 3 and 4 differs from that of FIGS. 1 and 2 only in that the bearing block 116 is formed in one piece with the guide carriage 112.

Figure 5:
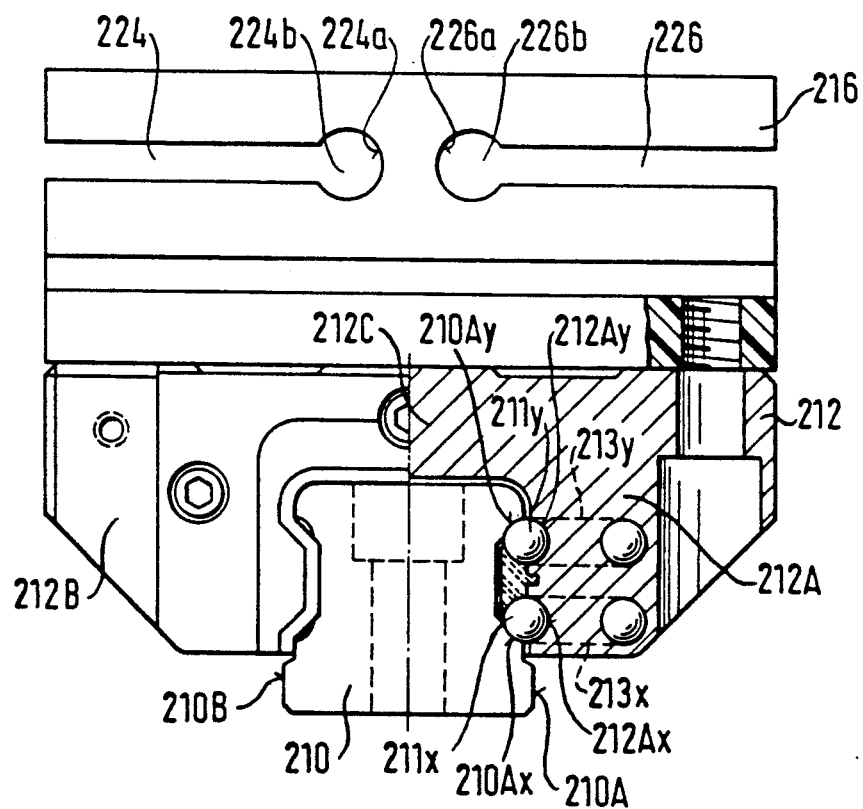
FIG. 5 a view corresponding to FIG. 1 with a different form of embodiment of the bearing block and illustrating details of the guide element.

The form of embodiment according to FIG. 5 corresponds basically to that of FIG. 1, with the difference that bores 224b and 226b are formed at the base of the slits 224 and 226, these bores forming the slit base surfaces 224a and 226a and serving for avoiding concentrations of notch stresses.

Furthermore, it can be seen in FIG. 5 that the guide carriage 212 is constructed with two flanges 212A and 212B, which are joined together by a web 212C. Between each of the flanges 212A and 212B and the associated lateral faces 210A and 210B of the guide rail 210, load-transmitting rows of balls 211x and 211y are provided, which each form part of a closed ball loop 213x and 213y respectively. The load-transmitting ball rows 211x and 211y run, on the one hand, on load-transmitting tracks 212Ax and 212Ay of the arm 212A and, on the other hand, on load-bearing tracks 210Ax and 210Ay of the guide rail 210.

Figure 6:
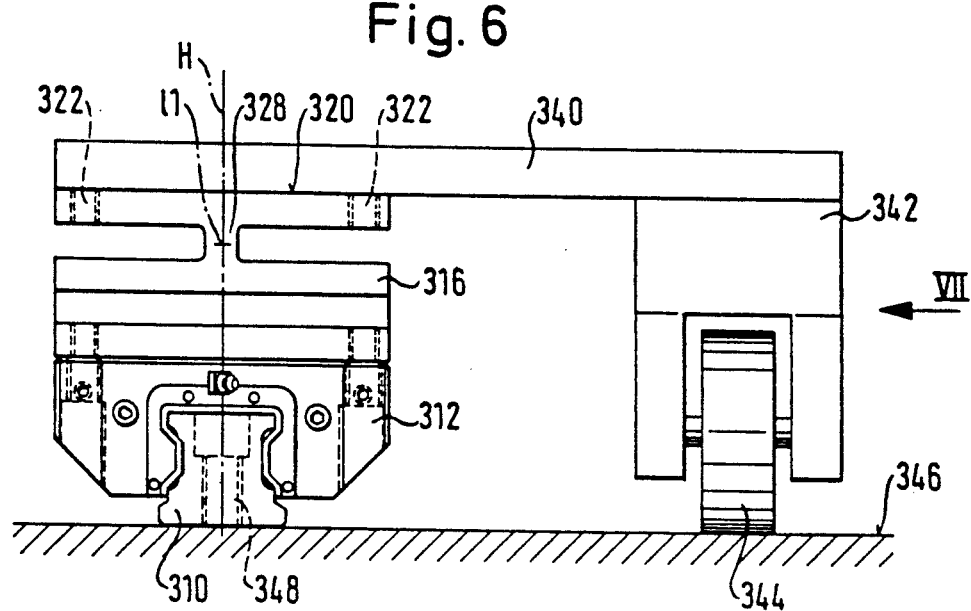
FIG. 6 a linear guide using the assembly according to FIG. 1.
Figure 7:
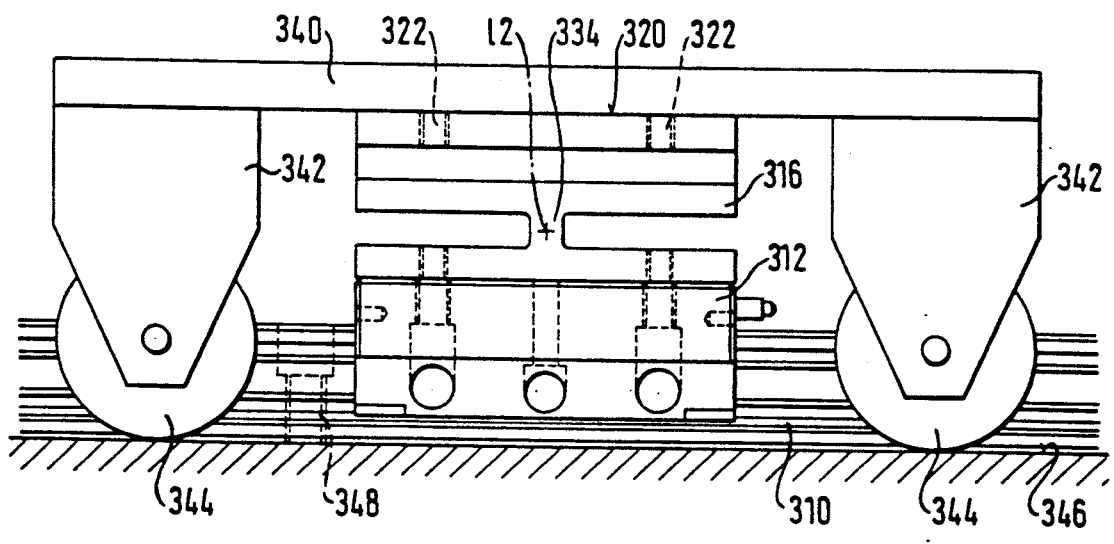
FIG. 7 a lateral view on FIG. 6 in the direction of arrow VII of FIG. 6.

In FIGS. 6 and 7, a linear guide for a structural element 340, constructed as a table, is illustrated. This table is guided on a guide rail 310 by means of a guide carriage 312 and an elastic bearing block 316, and only a single guide carriage 312 with a single bearing block 316 is provided, as can be seen from FIG. 7. Analogous parts bear the same references as in FIGS. 1 and 2, but increased by the number 300.

The table 340 is furthermore supported by two supporting elements 342 comprising rollers 344. The rollers 344 run on a running plane 346, to which the guide rail 310 is fixed by bolts 348.

It can be seen that the rollers 344 have no lateral guidance on the track 346. The lateral guidance is provided solely by the guide carriage 312, so there is no risk of constraint problems due to the guidance in the guide rail 310 on the one hand and engagement of the rollers 344 on the track plane 346 on the other hand. If errors in height occur between the track plane 346 on the one hand and the tracks of the guide rail 310 on the other hand, this error can be accommodated without difficulty by the internal bending of the bearing block 316 about the first bending axis 11. If, in addition, the tracks of the guide rail 310 run skew relative to the track plane 346, then this also can be compensated by the internal bending of the bearing block about the second bending axis 12. An oscillation of the table about the vertical axis H is excluded, because on the one hand the guide carriage 312 is guided free of oscillation on the guide rail 310 and on the other hand the two webs 328 and 334, on account of their length, ensure high torsional stiffness of the clamping face 320 relative to the guide carriage 312.

In FIGS. 8 and 9, two guide rails 410l and 410r are provided. On the guide rail 410l, a single guide carriage 412l runs, while on the guide rail 410r two guide carriages 412r1 and 412r2 run. All these guide carriages are connected by bearing blocks 416l, 416r1 and 416r2 to a table 440. A difference in height of the guide rails 410l and 410r can be compensated by internal bendings of the bearing blocks about the first bending axes 11. A skew orientation of the guide rails can be compensated by internal bending of the bearing blocks about the bending axes 12. Differences in parallelism between the guide rails 410l and 410r in the clamping plane 446 can be compensated by lateral offset in the direction of the double arrows P1, the webs 428l and 428r undergoing S-shaped deformations.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

I claim:

1. Elastic bearing block for mounting a structural element (340), which is to be linearly guided, on a guide element (12), which is linearly guided on a guide track assembly (10) in a guidance direction (S), wherein, in the bearing block (16), at least one first slit (24, 26), bounded by a first slit base (24a, 26a), is provided in a first virtual space slab (RI) approximately parallel to the guide direction (S), the first slit base (24a, 26a) of which slit bounds a first bending web (28) of the bearing block (16), and wherein this first bending web (28)—as viewed in a sectional plane (CI) parallel to the first virtual space slab (RI)—has an elongate cross-section with a short and a long cross-sectional axis (k1, l1) and the long cross-sectional axis (l1) forms a first bending axis (l1) of the bearing block (16), wherein in a second virtual space slab (RII), substantially parallel to the first virtual space slab (RI), at least one second slit (30, 32), bounded by a second slit base (30a, 32a) is provided, the second slit base (30a, 32a) of which, extending substantially perpendicularly to the first slit base (24a, 26a), bounds a second bending web (34) of the bearing block (16), this second bending web (34)—as viewed in a sectional plane (CII) substantially parallel to the second virtual space slab (RII)—has an elongate cross-section with a short and a long cross-sectional axis (k2, l2), and the long cross-sectional axis (l2) constitutes a second bending axis (l2) of the bearing block (16) and the second bending axis (l2) crosses the first bending axis (l1) approximately perpendicularly.

2. Elastic bearing block according to claim 1, characterized in that the first bending axis (l1) extends substantially parallel to the guide direction (S) and the second bending axis (l2) extends substantially perpendicularly to the guide direction (S).

3. Elastic bearing block according to claim 1, characterized in that, in at least one of the first and the second space slabs (RI, RII), two first and two second slits (24, 26; 30, 32 respectively) are provided, the slit bases (24a, 26a; 30a, 32a respectively) of which form between them the first and second bending webs (28; 34 respectively).

4. Elastic bearing block according to claim 1, characterized in that the bearing block (16), as viewed in a direction perpendicular to the space slabs (RI, RII), has a substantially rectangular outline, and that the two bending webs (28, 34) each run parallel to one boundary side of the rectangular outline.

5. Elastic bearing block according to claim 4, characterized in that the two bending axes (11, 12) cross each other at the centre of the rectangular outline.

6. Elastic bearing block according to claim 1, characterized in that the bearing block (16) is releasably connected with at least one of the parts guide element (12) and structural element (340).

7. Elastic bearing block according to claim 6, characterized in that the bearing block (16) bears against at least one of the parts structural element (340) and guide element (12) in a fixing plane (20, 14), which is approximately parallel to the first and the second bending axes (l1, 12).

8. Elastic bearing block according to claim 1, characterized in that the bearing block (116) is produced in one piece with at least one of the parts guide element (112) and structural element.

9. Elastic bearing block according to claim 1, characterized in that the slit base (224a, 226a) of at least one of the slits (224, 226) is formed by the peripheral surface of a bore (224b, 226b) opening into the slit (224, 226).

10. Elastic bearing block according to claim 9, characterized in that the bore (224b, 226b) has a diameter larger than the width of the slit.

11. Elastic bearing block according to claim 1, characterized in that it is made of metal.

12. Elastic bearing block according to claim 11, characterized in that it is made of spring steel.

13. Linear guide for a structural element (340) on at least one guide rail (10) using at least one bearing block (16) according to claim 1 as connecting means between the structural element (340) and at least one guide element (12), guided on the guide rail (10), wherein the guide element (12) is non-rotatable on the guide rail (10) about the axis (S) of the guide rail (10).

14. Linear guide according to claim 13, characterized in that the structural element (340) is mounted by at least one bearing block (316) on at least one guide element (312) running on a guide rail (310), and that the structural element (340) is furthermore guided by at least one additional supporting element (344) on a supporting track (346) parallel to the guide rail (310) and located outside the guide rail (310).

15. Linear guide according to claim 14, characterized in that the total number of guide elements (312) and additional supporting elements (344) is at least and preferably 3.

16. Linear guide according to claim 14, characterized in that the supporting element (344) is a roller (344).

17. Linear guide according to claim 16, characterized in that the roller (344) runs on a running plane (346), which at the same time is the support for the guide rail (310).

18. Linear guide according to claim 14, characterized in that two supporting elements (344), spaced apart in the guidance direction (S), are provided adjacent to one guide element (312).

19. Linear guide according to claim 13, characterized in that the structural element (440) is guided on two substantially parallel guide rails (410l, 410r) by at least one guide element each (412l, 412r1, 412r2).

20. Linear guide according to claim 19, characterized in that the structural element (440) is guided on a first guide rail (410r) by two guide elements (412r1, 412r2) by means in each case of a bearing block (416r1, 416r2), and on the second guide rail (410l) by a single guide element (412l), once again by means of one bearing block (416l).

21. Linear guide according to claim 13, characterized in that the guide element (212) is U-shaped, comprising at least two arms (212A, 212B), accommodating between them a part of the guide rail (210), and a web (212C), connecting these arms (212A, 212B) together, wherein at least one roller circuit (213x, 213y) is associated with each of the arms and each of the roller circuits (213x, 213y) possesses a load-transferring row of rollers (211x, 211y) in engagement each with one load-bearing track (212Ax, 212Ay) of the relevant arm (212A, 212B) of the guide element (212) and one load-transferring track (210Ax, 210Ay) on a lateral surface (210A, 210B) of the guide rail (210) adjacent to this arm (212A, 212B), and wherein furthermore at least one bearing block (216) is mounted on the web (212C).

* * * * *